US012633856B2

(12) United States Patent
Kuehn et al.

(10) Patent No.: US 12,633,856 B2
(45) Date of Patent: May 19, 2026

(54) METHOD FOR ADJUSTING VALUES OF A PLURALITY OF PARAMETERS OF AT LEAST ONE CONTROLLER OF AN ELECTRIC DRIVE SYSTEM, AND ELECTRIC DRIVE SYSTEM

(71) Applicant: Lenze Automation GmbH, Aerzen (DE)

(72) Inventors: Johannes Kuehn, Braunschweig (DE); Lars Perner, Vechelde (DE); Thomas Petersen, Braunschweig (DE)

(73) Assignee: Lenze Automation GmbH, Aerzen (DE)

( * ) Notice: Subject to any disclaimer, the term of this patent is extended or adjusted under 35 U.S.C. 154(b) by 758 days.

(21) Appl. No.: 16/767,040

(22) PCT Filed: Nov. 27, 2018

(86) PCT No.: PCT/EP2018/082674
§ 371 (c)(1),
(2) Date: Jun. 28, 2021

(87) PCT Pub. No.: WO2019/102032
PCT Pub. Date: May 31, 2019

(65) Prior Publication Data
US 2022/0069753 A1      Mar. 3, 2022

(30) Foreign Application Priority Data
Nov. 27, 2017    (DE) .................... 10 2017 221 222.5

(51) Int. Cl.
*H02P 23/00*        (2016.01)
*B60W 10/08*        (2006.01)

(52) U.S. Cl.
CPC ...... *H02P 23/0027* (2013.01); *H02P 23/0077* (2013.01); *B60W 10/08* (2013.01)

(58) Field of Classification Search
CPC .................................................... B60W 10/08
USPC ............................................................ 701/22
See application file for complete search history.

(56) References Cited

U.S. PATENT DOCUMENTS 5,475,291 A * 12/1995 Yoshida ............... G05B 19/409
                                                                                318/632
5,684,375 A     11/1997 Chaffee et al.
2003/0040817 A1  2/2003 Krah et al.

FOREIGN PATENT DOCUMENTS

DE      10 2010 056 295 A1      6/2012
WO      WO-2007122904 A1 * 11/2007    ............. H02P 29/00

OTHER PUBLICATIONS

Anonymous, "Tuning/Parameter Setting: Auto Tuning?", Jun. 30, 2016, pp. 88-103, XP055552035 (Year: 2016).*
English translation of document B1 (DE 10 2010 056 295 A1 filed on May 26, 2020) (ten (10) pages).

(Continued)

*Primary Examiner* — Helal A Algahaim
*Assistant Examiner* — John D Holman
(74) *Attorney, Agent, or Firm* — Crowell & Moring LLP

(57)      ABSTRACT

A method adjusts values of a plurality of parameters of at least one controller of an electric drive system. The method provides an individual replacement parameter value that can be adjusted by a user. After adjusting the replacement parameter value, the method calculates the values of the plurality of parameters from the adjusted replacement parameter value.

3 Claims, 3 Drawing Sheets

(56)            References Cited

OTHER PUBLICATIONS

German-language European Office Action issued in European Application No. 18 811 217.1 dated Dec. 2, 2021 (five (5) pages).

International Search Report (PCT/ISA/210) issued in PCT Application No. PCT/EP2018/082674 dated Feb. 13, 2019 with English translation (seven (7) pages).

Japanese-language Written Opinion (PCT/ISA/237) issued in PCT Application No. PCT/EP2018/082674 dated Feb. 13, 2019 (six (6) pages).

Gao, "Scaling and Bandwidth-Parameterization Based Controller Tuning," Proceedings of the American Control Conference, 2003, pp. 4989-4996 (eight (8) pages).

Anonymous, Tuning / Parameter Setting: Auto Tuning?, Jul. 1, 2016, pp. 88-103, retrieved from the Internet on Feb. 5, 2019: http:/www.schelder-electric.com/resources/sites/SCHNEIDER_ELECTRIC/content/live/FAQS/292000/FA292680/en_US/LX_M32_AutoTuning.pdf XP055552035 (16 pages).

Armstrong et al., "Load to Motor Inertia Mismatch: Unveiling the Truth," Jan. 1, 1998, Retrieved from the Internet on Feb. 5, 2019. http:/pdfs.semanticscholar.org/f1d3/fleee2a1a3380eb5cdbc3a605a21c6058bfd.pdf, XP055552045, (13 pages).

* cited by examiner

METHOD FOR ADJUSTING VALUES OF A PLURALITY OF PARAMETERS OF AT LEAST ONE CONTROLLER OF AN ELECTRIC DRIVE SYSTEM, AND ELECTRIC DRIVE SYSTEM

BACKGROUND AND SUMMARY OF THE INVENTION

The invention relates to a method for setting values of a plurality of parameters of at least one controller of an electric drive system, and to an electric drive system.

The invention is based on the object of providing a method for setting values of a plurality of parameters of at least one controller of an electric drive system and an electric drive system that make it possible to set the values of the parameters as easily as possible and in the most optimum manner possible with regard to an achievable control quality.

The invention achieves this object by way of a method and a drive system according to the claimed invention.

The method according to the invention is used to set values of parameters of one or more controllers, wherein the controller or controllers is or are part of an electric drive system.

According to the invention, a single replacement parameter value is generated and presented in a manner able to be set by a user.

After the replacement parameter value has been set by the user, the values of the plurality of parameters are calculated based on the set replacement parameter value and stored, for example. The end of the setting may be confirmed explicitly by the user, such that a transition and storage of the values of the parameters take place only after the confirmation. By way of example, a user may move a slide controller horizontally or vertically between two limit positions in order to set the replacement parameter value, wherein one of the limit positions denotes a "soft" control behavior and the other of the limit positions denotes a "hard" control behavior.

According to one embodiment, the electric drive system has a position controller and a rate of rotation controller, wherein the plurality of parameters are parameters of the position controller and parameters of the rate of rotation controller.

According to one embodiment, the position controller has a proportional (P) parameter to be set and the rate of rotation controller has a P parameter to be set, an I (integral) parameter to be set and/or a filter time to be set.

Several dependencies exist in the case of setting controller parameters. Conventionally, the position controller (P controller) is first of all set to be soft. The values of the parameters of the rate of rotation controller (firstly P then I) are then set to be rigid. Finally, the position controller is then set to be rigid. The rate of rotation controller then has to be checked again. The procedure takes a long time, even for experienced technicians. Since the filter time of the rate of rotation value still also plays a role, there is a dependency on at least four parameters.

It is however difficult to manually set four or more values of the parameters at the same time, since the combination options are extremely extensive. For this reason, a sequential procedure is typically chosen, but this does not lead to optimum controller parameterization.

According to the invention, the controller parameters are now not set themselves, but rather a replacement parameter value is set using mathematical equations. By way of example, a load tuning factor $k_j$ may be provided as replacement parameter value. Any desired soft-rigid value may however also be provided as replacement parameter value. The replacement parameter value may for example be set by way of a physical or software-simulated potentiometer. All of the relevant values of the parameters are recalculated by changing/rotating the potentiometer or changing the replacement parameter value. Iteratively setting the individual values of the parameters is dispensed with.

By way of example, a setting procedure may be started with a replacement parameter value or load tuning factor $k_j$ of 1.0. The replacement parameter value is then increased until the control quality is sufficient or noise occurs, for example. Due to the fact that only a single replacement parameter value needs to be set, a required setting time is reduced considerably.

The controller or controllers may be based on a state controller, wherein the parameter values thereof are set as described above with the interposition of the replacement parameter value.

The electric drive system may also have a state controller for mechanical control variables, wherein the plurality of parameters are parameters of the state controller.

According to one embodiment, it is determined, on the basis of simulated and/or measured operating variables of the electric drive system, whether at least one control circuit to which the at least one controller is assigned reaches or exceeds its stability limit, that is to say is/becomes marginally stable or unstable. This may be the case for example when a drive oscillates in a marginally stable manner. The proximity to the stability limit may be determined for example by analyzing the rate of rotation profile and/or the moment profile. The control circuit may be for example a position control circuit, rate of rotation control circuit, current control circuit, etc. The stability detection, limit stability detection and/or instability detection may be performed based on stability criteria that are known per se.

According to one embodiment, the operating variables have a temporal profile of a current of an electric motor of the electric drive system and/or a temporal profile of a rate of rotation of the electric motor and/or a temporal profile of a position of a component to be moved by way of the electric drive system.

According to one embodiment, a for example electric/optical/haptic/acoustic signal that signals an unstable state of the at least one control circuit is generated. The signal may for example be perceptible to an operator of the electric drive system and/or also be able to be further processed automatically.

Changing the controller parameterization and/or changing the load may lead to instability of control circuits. Detecting such instability is not always easy. A single value of a parameter or one controller parameter of several is typically increased until noise or visible oscillations occur. Since noise and oscillations are however perceived subjectively to a large extent, the values of the parameters are set according to subjective assessments by the commissioning engineer, and therefore differently.

According to the invention, a signal that signals an unstable state of the at least one control circuit is generated automatically. The signal may for example be represented as a Boolean signal in commissioning software or a colored or multicolored LED or represented as levels in an oscilloscope representation. The signal signals that instability has been reached or the stability limit is being approached or the stability limit has been exceeded.

In the case of an LED representation, the LED is for example activated more often the closer the control circuit is to its stability limit. It is also possible to effect a color change, for example from green to yellow to red. A setting rule for the values of the parameters may therefore for example be worded as follows: Change the values of the parameters in the direction of instability until the LED noticeably flickers. Then recede by 30%. This procedure is also able to be automated.

As an alternative, the signal may continuously adopt values between an upper limit that represents instability and a lower limit that represents the stable state. The closer the signal gets to the upper limit, the closer the control circuit is to its stability limit. The setting rule for the values of the parameters may in this case for example be worded as follows: Change the values of the parameters in the direction of instability until the signal displays a value of for example "70% stable".

In order to calculate the signal or in order to calculate the state or value of the signal, it is possible for example to take into account various variables, such as for example temporal profile of a current, temporal profile of a rate of rotation, and/or temporal profile of a position.

Various mathematical filters and frequency analysis methods (for example wavelet analysis, FFT, DFT, etc.) may be used to calculate the signal or to calculate the state or value of the signal. In addition or as an alternative, it is possible for example to use measured values from external acceleration sensors or microphones.

The signal that displays stability according to the invention, in comparison with conventional parameter value setting methods that are based on a subjective perception of instability, allows faster and easier and in particular manual commissioning. The signal that displays stability according to the invention offers for example visual assistance when commissioning in a loud environment, since it is then possible to hear over noise that arises as a result of inadequately set controller parameters. Automatic commissioning is furthermore also possible. In addition, service functions and/or preventative and/or prospective maintenance functions are able to be implemented based on the signal that displays stability since it is possible to detect instability that sets in gradually. The signal that displays stability according to the invention furthermore allows reproducible parameter value setting.

According to one embodiment, the values of the plurality of parameters are changed automatically or without user interaction in a defined order, in a random order, or at the same time until the at least one control circuit is no longer stable or until the at least one control circuit reaches or exceeds its stability limit, wherein the values of the plurality of parameters that set in when the control circuit is no longer stable are stored as reference values. The values of the plurality of parameters are then set based on the reference values. By way of example, the values of the plurality of parameters may be calculated by multiplying the reference values by a factor of less than 1. The values of the parameters calculated in this way may then be compared with values that are determined depending on inertias and runtimes of the drive system.

In servo-converters, the rate of rotation control and the position control have to be adapted to the controlled system. Unlike in the case of a current controller, in which the values of the parameters of the controllers are able to be derived from the associated motor specifications, the rate of rotation controller and position controller have to be adapted manually to the mechanical controlled system that is present. This takes a long time and requires experience. In order to make this easier, it is also possible to calculate the values of the parameters. To this end, a mathematical model of the controlled system and the controlled system parameters (masses, elasticities, damping, slackness, etc.) that are specifically present are required. The controller parameters are able to be calculated approximately based on this model.

Calculating the values of the parameters from the model works well in principle, but matching the model to reality is fundamentally limited. If the model is too imprecise or details such as for example the natural frequency of the controlled system are lacking, then the control quality that is achieved is not optimum or the controller is possibly even unstable.

A manual optimization is therefore usually additionally performed. To this end, the stability limit is generally determined based on Ziegler-Nichols. Firstly the rate of rotation controller and then the position controller are set. To this end, the stability limit is determined by increasing the gain factors in steps. 45% or 50% of the highest stable gain is then used. This manual setting takes a long time, is difficult to reproduce and is essentially based on the subjective assessment of the commissioning engineer. It does not however rely on the knowledge of system properties such as natural frequency and is used very often, in particular when the system contains elasticities.

In order to solve this problem, according to the invention, the values of the parameters are determined automatically for a marginally stable controller setting, wherein the optimum values of the parameters of the controller are determined therefrom.

The values of the parameters are increased in steps, as in the case of manual setting. However, the stepped increase takes place automatically, that is to say the values of the parameters are set automatically. This saves time and leads to good reproducibility.

Unlike in the case of Ziegler-Nichols, it is additionally possible to take into account another optimization criterion (for example least squares of the tracking error of the shaft during the test movement).

According to the invention, in order to automatically set the values of the parameters, in particular of a rate of rotation controller and possibly a position controller, the method is automatically performed iteratively as follows. Values of one or more parameters of one or more controllers are changed automatically and the resultant control quality is assessed automatically. A signal or a stability indicator is determined automatically, wherein the signal or the stability indicator objectifies the stability limit. A quality criterion is used to assess the current setting of the values of the parameters. This may be calculated for example based on Ziegler-Nichols. A starting value for the value or values of the parameter or parameters may be the controller setting with a motor at no load. The method according to the invention may be combined with a conventional system identification in order advantageously to jointly incorporate the results thereof.

According to the invention, the values of the parameters of the controllers are set automatically, iteratively and heuristically, and not by considering a model as is conventional. As a result, parameter uncertainties or model errors are irrelevant to the controller parameterization. An optimization criterion and the stability indicator are taken into account in the control. The method may be purely heuristic automated setting of the values of the parameters of the controllers without referring to a physical model of the system.

This leads to faster commissioning, improved tuning of the controllers through more refined steps and better reproducibility of the controller setting, wherein an optimization criterion is taken into account in addition to the determined stability limit.

The control quality may be calculated based on a sum of least squares. In this case, the same trajectories of a driven component may be measured, wherein the highest control quality contains those values of the parameters whose sum is minimal. In contrast to an average value, in this case larger errors are emphasized overproportionately, since they are squared.

According to the invention, the values are divided by a number of measurement points that are used, wherein the root is finally taken from the intermediate result. By way of example, 1000 measurement points over a plurality of movements may be used. If the movement is shorter, just a single movement may be used.

Some examples of calculation rules for the quality criterion are set forth below.

In its simplest form, the quality criterion, referred to here as G1, is calculated as follows:

$$G1 = \sqrt{\frac{1}{N}\sum_{n=1}^{N}(e(n))^2}$$

wherein N denotes a number of measured values, n denotes a sample and e(n) denotes a control error in the sample n.

For N=1000, this results for example in:

$$G1 = \sqrt{\frac{1}{1000}\sum_{n=1}^{1000}(e(n))^2}$$

A moment-normalized quality criterion, denoted here as G2, may be calculated as follows:

$$G2 = \frac{1000 \cdot Mnenn}{\sum_{n=1}^{1000}M(n)}\sqrt{\frac{1}{1000}\sum_{n=1}^{1000}(e(n))^2}$$

wherein M(n) denotes a moment in the sample n and Mnenn denotes a nominal moment.

A further moment-normalized quality criterion, denoted here as G3, may be calculated as follows:

$$G3 = \sqrt{\frac{1}{1000}\sum_{n=1}^{1000}\frac{Mnen}{M(n)}(e(n))^2}$$

The quality criterion may be determined for example by way of a frequency converter or servo-converter during the runtime thereof and may therefore be observed at any time in the trend in the converter, such as for example a motor temperature. The quality criterion provides information about the quality of the control and the quality of the preliminary control online, and may be output for consumption logs and tests.

According to one embodiment, an operating surface may be generated in order to set the values of the plurality of parameters. In other words, the values of the plurality of parameters are set by way of the operating surface.

The operating surface has a first setting mode, during which just a single value is able to be set in the form of the replacement parameter value. Further setting options relating to the values of the parameters are not present in the first setting mode.

The operating surface furthermore has a further or second setting mode, in which data relating to at least one control circuit to which the at least one controller is assigned are able to be input, wherein the values of the plurality of parameters are calculated from the input data relating to the at least one control circuit in the second setting mode.

The first setting mode is for example expedient for a mechanic who wishes only to move an electric motor. The mechanic usually does not know the parameters of the controlled system that are relevant to setting. The mechanic is able to perform all of the settings relevant to said mechanic by way of the replacement parameter value.

A constructor knows the engine and the relevant mechanical properties. It is easily possible for said constructor to design the controller for example based on inertias and natural frequencies. The second setting mode is therefore provided for said constructor.

In addition to the second setting mode, it is possible to provide even more setting modes, for example a third setting mode in which a control engineering expert is able to use a jump response or a Bode plot to determine a suitable controller design.

The invention is described in detail below with reference to the drawings.

DETAILED DESCRIPTION OF THE DRAWINGS

Figures 1, 2:
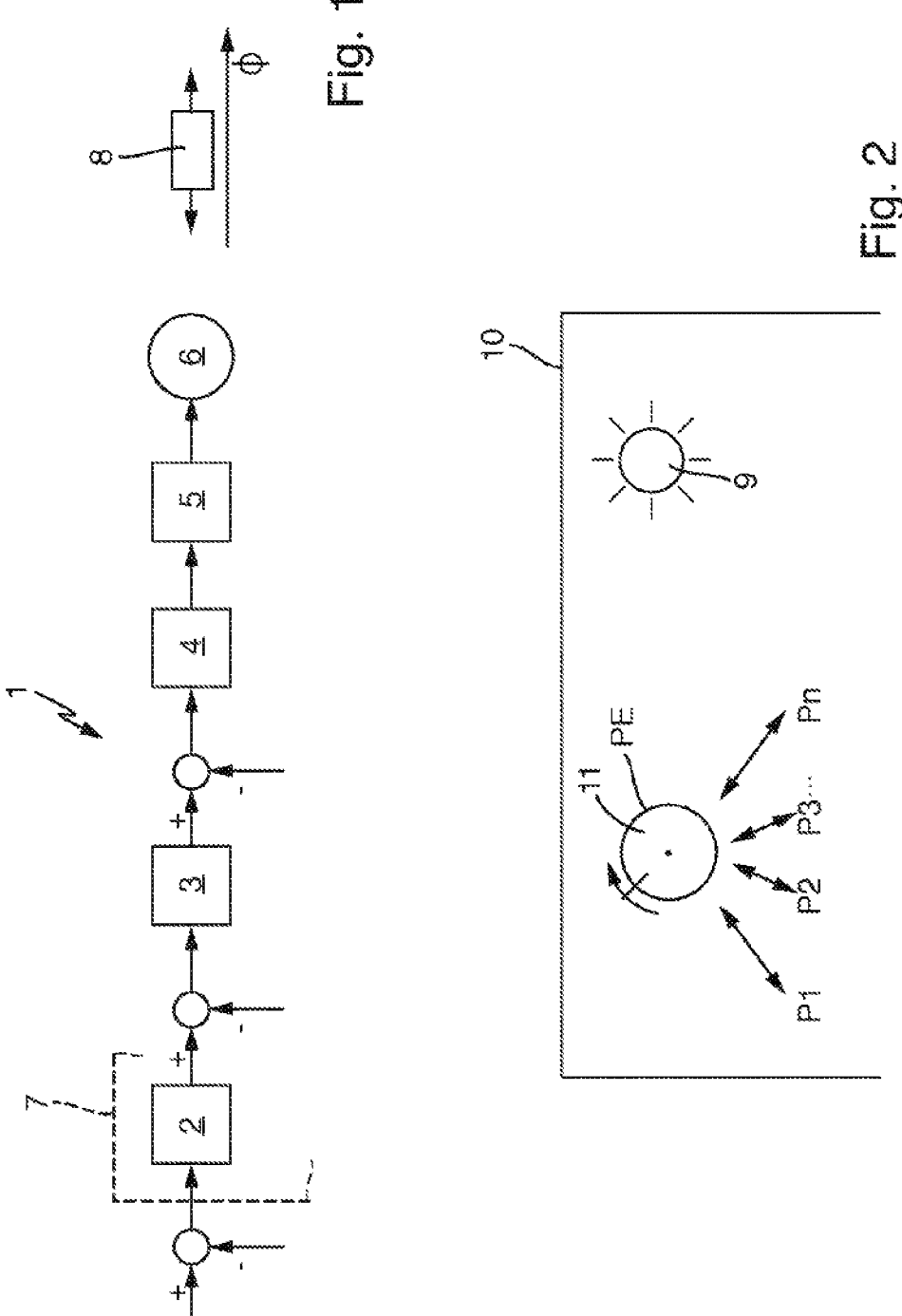
FIG. 1 shows a schematic block diagram of an electric drive system according to an embodiment of the invention.
FIG. 2 shows an operating surface for setting a replacement parameter of a controller of the electric drive system shown in FIG. 1.

FIG. 1 shows an electric drive system 1 in highly schematic form.

The electric drive system 1 has a position controller 2, a rate of rotation controller 3 connected downstream of the position controller 2, a current controller 4 connected downstream of the rate of rotation controller 3 and an inverter 5 driven by way of the current controller 4, wherein the inverter 5 conventionally drives an electric motor 6. Such a cascaded controller structure is known per se, and so reference may also be made to the relevant specialist literature in this respect.

The components 2 to 5 may be part of a servo-converter.

The electric drive system 1 serves to move a mechanical component 8.

With reference to FIG. 2, an operating surface or parameterization device 10, which may be in the form for example of a PC with corresponding parameterization software, is provided in order to set values of parameters P1, P2, . . . . Pn of at least one of the controllers 2, 3, 4.

The position controller 2 has a P parameter to be set, denoted P1 by way of example in FIG. 2.

The rate of rotation controller 3 has a P parameter to be set, denoted P2 by way of example in FIG. 2, an I parameter to be set, denoted P3 by way of example in FIG. 2, and a filter time to be set, denoted Pn by way of example in FIG. 2.

The parameters P1 to Pn are illustrated only symbolically in FIG. 2 and are not visible to a user and are not able to be set directly in the illustrated operating mode of the parameterization device 10.

Rather, a replacement parameter setting unit 11 is visible and able to be operated, by way of which replacement parameter setting unit a replacement parameter value PE is able to be set by the user. A setting procedure may for example involve rotating the replacement parameter setting unit 11, vertically or horizontally sliding the replacement parameter setting unit 11, etc.

Following setting and/or during setting of the replacement parameter value PE, the parameterization device 10 calculates the values of the plurality of parameters P1, P2, ... Pn from the set replacement parameter value PE based on a predefined algorithm, such that the user performing setting is spared from a complex setting procedure in which said user has to set all of the parameters, possibly also in a specific order.

Figure 3:
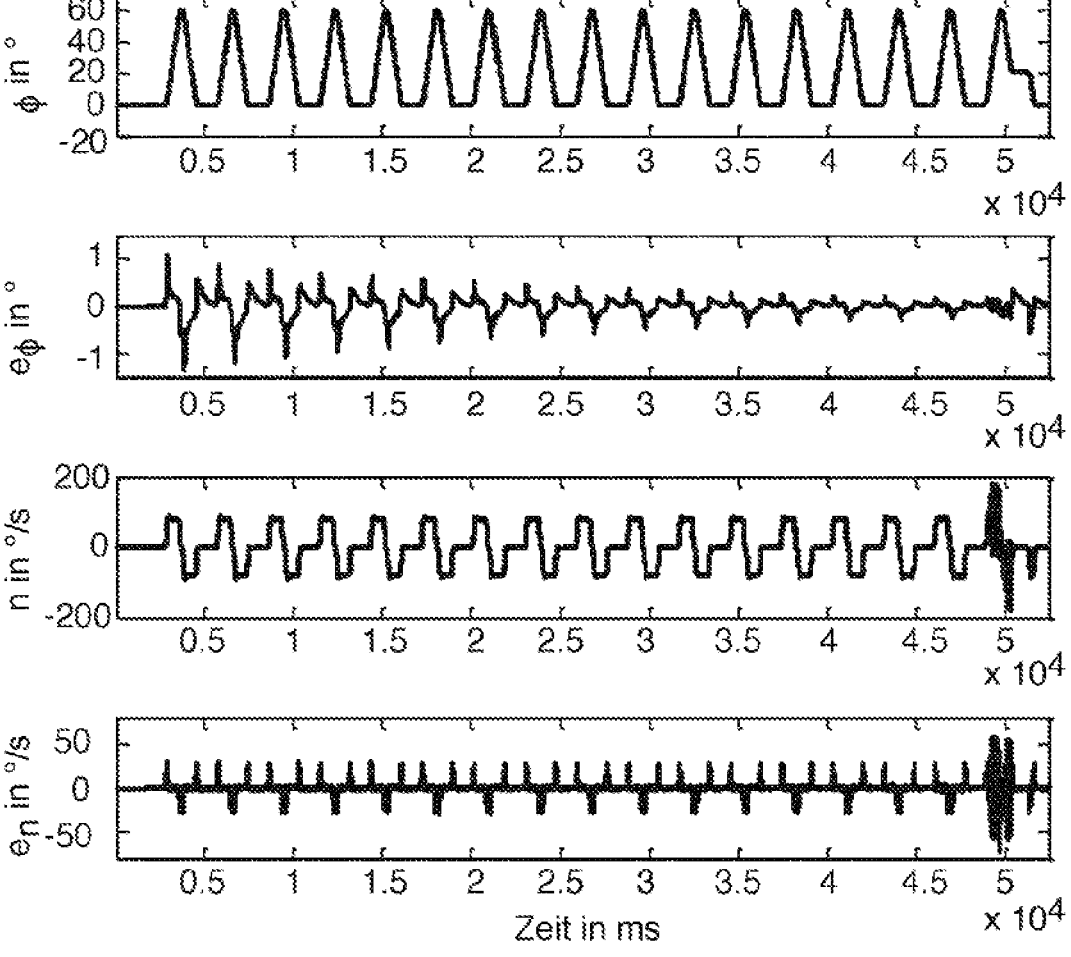
FIG. 3 shows a temporal profile of signals in the course of automatically setting values of a parameter of a rate of rotation controller shown in FIG. 1.

FIG. 3 shows a temporal profile of signals in the course of automatically setting the values of at least one of the parameters P1 to Pn of the controllers 2 to 4 shown in FIG. 1. In detail, FIG. 3 illustrates a setting optimization profile of a value of a parameter in the form of a gain factor of the PID rate of rotation controller 3.

In the graph at the top, the profile of a motor position Ø is illustrated in °. Each "serration" represents a desired individual movement of the motor 6.

In the graph below, the error $e_\emptyset$ in ° is illustrated as a quality criterion. The error $e_\emptyset$ becomes smaller when the controller is set to be increasingly rigid with an increasing gain factor over time.

The graphs below illustrate the rate of rotation n in °/s and the rate of rotation error $e_n$ in °/s. The bottom graph on the far right shows an oscillation starting, that is to say the stability limit is reached, this being detected according to the invention and being used for the optimized setting of the values of the parameters of the controllers.

Figure 4:
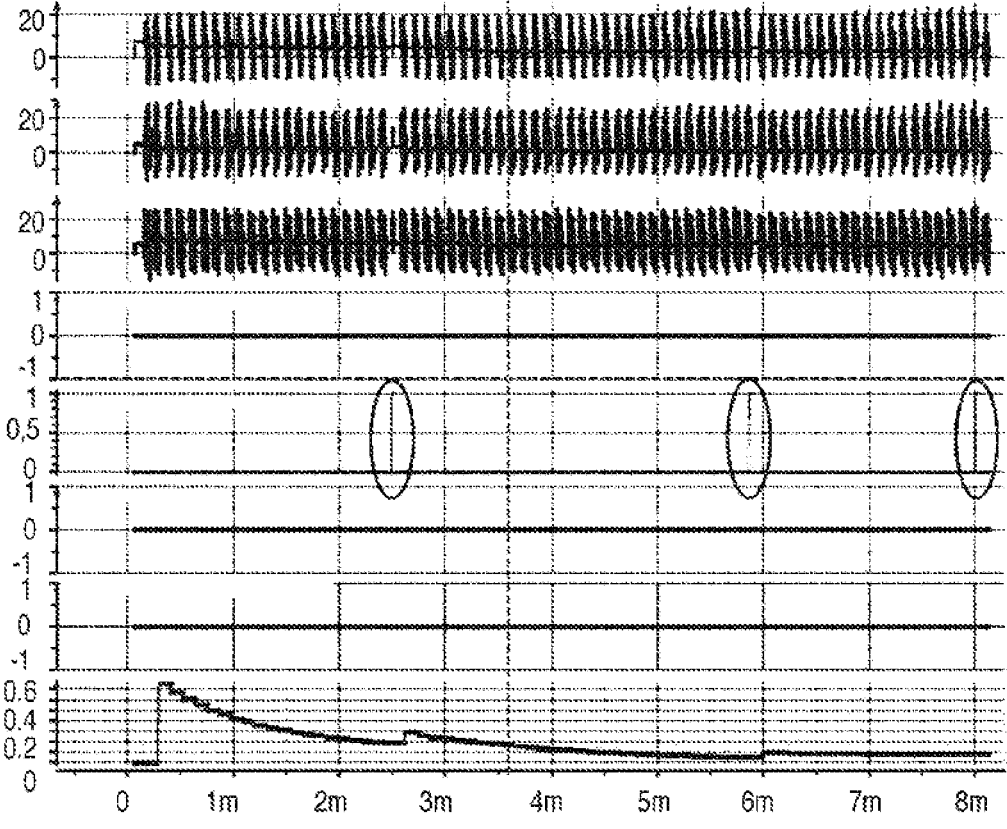
FIG. 4 shows a temporal profile of signals in the course of automatically setting values of three parameters of the controllers illustrated in FIG. 1.

FIG. 4 accordingly shows a temporal profile of signals in the course of automatically setting values of three parameters of the controllers 2, 3 and 4 illustrated in FIG. 1.

The top three signals form input signals for determining the stability limit and/or control quality, followed by three signals derived from the input signals and that display a detected stability limit, and the bottom graph finally illustrates the profile of the control quality.

As is apparent from FIG. 4, the control quality is able to be improved considerably by way of automatically setting the values of the parameters of the controllers based on automatically detecting the stability limit, such that it is possible for example to considerably reduce a tracking error.

The invention claimed is:

1. A method for setting values of a plurality of parameters of at least one controller of an electric drive system, the method comprising:

generating an operating surface on a display;

setting values of a plurality of parameters through the user interacting with the operating surface, wherein setting the values of the plurality of parameters comprises:

when the operating surface is in a first setting mode:

receiving a value of an individual replacement parameter by the user interacting with the operating surface in the first setting mode, wherein the user sets only the individual replacement parameter value; and when the operating surface is in a second setting mode that is distinct from the first setting mode:

receiving input data related to at least one control circuit to which the at least one controller is assigned by the user interacting with the operating surface in the second setting mode;

when the operating surface is in the first setting mode, calculating values of the plurality of parameters from the set individual replacement parameter value; and when the operating surface is in the second setting mode, calculating values of the plurality of parameters from the input data from the user relating to the at least one control circuit;

wherein:

the electric drive system has a position controller and a rate of rotation controller;

the plurality of parameters are parameters of the position controller and parameters of the rate of rotation controller;

the position controller has a position controller P parameter that is set by way of the operating surface when setting the values of the plurality of parameters; and the rate of rotation controller has a rotation controller P parameter, an I parameter, and a filter time that are set by way of the operating surface when setting the values of the plurality of parameters.

2. The method according to claim 1, wherein the electric drive system has a state controller for mechanical control variables, and the plurality of parameters are parameters of the state controller.

3. An electric drive system, comprising:

at least one controller;

a display; and a controller parameterization device that is configured to execute program code to:

generate an operating surface on the display;

set values of a plurality of parameters through a user interacting with the operating surface on the display, wherein to set the values of the plurality of parameters, the controller is configured to:

when the operating surface is in a first setting mode:

receive a value of an individual replacement parameter by the user interacting with the operating surface in the first setting mode, wherein the user sets only the individual replacement parameter value; and when the operating surface is in a second setting mode that is distinct from the first setting mode:

receive input data related to at least one control circuit to which the at least one controller is assigned by the user interacting with the operating surface in the second setting mode;

when the operating surface is in the first setting mode, calculate values of the plurality of parameters from the set individual replacement parameter value; and when the operating surface is in the second setting mode, calculate values of the plurality of parameters from the input data from the user relating to the at least one control circuit;

wherein the electric drive system further comprises a position controller and a rate of rotation controller;

wherein the plurality of parameters are parameters of the position controller and parameters of the rate of rotation controller;

wherein the position controller has a position controller P parameter that is set by way of the operating surface on the display when setting the values of the plurality of parameters; and wherein the rate of rotation controller has a rotation controller P parameter, an I parameter, and a filter time that are set by way of the operating surface on the display when setting the values of the plurality of parameters.

\* \* \* \* \*